(12) United States Patent
Liu

(10) Patent No.: US 7,848,088 B2
(45) Date of Patent: Dec. 7, 2010

(54) MOUNTING APPARATUS FOR POWER SUPPLY

(75) Inventor: Jen-Yee Liu, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 101 days.

(21) Appl. No.: 12/344,578

(22) Filed: Dec. 28, 2008

(65) Prior Publication Data

US 2009/0310299 A1  Dec. 17, 2009

(30) Foreign Application Priority Data

Jun. 13, 2008  (CN) .................... 2008 1 0302134

(51) Int. Cl.
*H05K 7/00* (2006.01)
(52) U.S. Cl. .................. 361/679.02; 361/709; 361/725; 361/807; 361/810; 312/223.2; 439/527; 439/544; 248/220.21; 248/231.9
(58) Field of Classification Search ............ 361/679.01, 361/679.02, 679.33, 679.38, 679.41, 679.55, 361/679.58, 679.6, 707, 709, 719, 725, 816, 361/807, 810
See application file for complete search history.

(56) References Cited

U.S. PATENT DOCUMENTS

| 5,777,848 | A  | * | 7/1998  | McAnally et al. | ........... 361/725   |
|-----------|----|---|---------|-----------------|----------------------|
| 5,852,544 | A  | * | 12/1998 | Lee             | ........... 361/679.6 |
| 6,229,696 | B1 | * | 5/2001  | Lin et al.      | ........... 361/679.58 |
| 6,354,869 | B1 | * | 3/2002  | Cranston et al. | ........... 439/544   |
| 6,685,503 | B1 | * | 2/2004  | Huang et al.    | ........... 439/527   |
| 7,265,981 | B2 | * | 9/2007  | Lee             | ........... 361/707   |
| 7,495,925 | B2 | * | 2/2009  | Chen et al.     | ........... 361/726   |
| 2002/0159230 | A1 |  | 10/2002 | Lin         |                      |
| 2005/0152107 | A1 | * | 7/2005 | Chen et al. | ........... 361/683 |
| 2007/0153451 | A1 | * | 7/2007 | Chen et al. | ........... 361/679 |

\* cited by examiner

*Primary Examiner*—Jayprakash N Gandhi
*Assistant Examiner*—Courtney Smith
(74) *Attorney, Agent, or Firm*—Zhigang Ma

(57) ABSTRACT

A mounting apparatus for mounting a power supply having a first connector on a front side, includes an enclosure, a bracket, and a board. The enclosure includes a rear wall defining an opening for the power supply passing therethrough. The bracket is mounted to the enclosure below the opening, capable of supporting the power supply. A second connector protrudes up from a front end of the bracket, configured for engaging with the first connector of the power supply. The board is attached to a rear side of the power supply, to cover the opening of the rear wall. A plurality of latching slots is defined in the enclosure or the bracket. A plurality of hooks is formed on the board, to engage in the plurality of latching slots.

17 Claims, 6 Drawing Sheets

MOUNTING APPARATUS FOR POWER SUPPLY

BACKGROUND

1. Technical Field

The present disclosure relates to mounting apparatuses for attaching electronic components to devices such as computer systems and, more particularly, to a mounting apparatus for mounting a power supply to a computer system.

2. Description of Related Art

Generally speaking, a power supply is a necessary electronic component to be assembled in a computer enclosure. The power supply is often directly attached to a rear panel of the computer enclosure via a plurality of screws installed from inside of the computer enclosure. Therefore, space in the computer enclosure must exist for assembling or disassembling the power supply via a tool such as screwdriver. However, while more and more electronic components are mounted in the computer enclosure, the size of the computer enclosure becomes smaller and smaller, thereby, the operation of assembling or disassembling the power supply in or from the computer enclosure becomes inconvenient.

What is desired, therefore, is an apparatus for mounting a power supply which overcomes the above-mentioned shortcoming.

DETAILED DESCRIPTION

Figure 1:
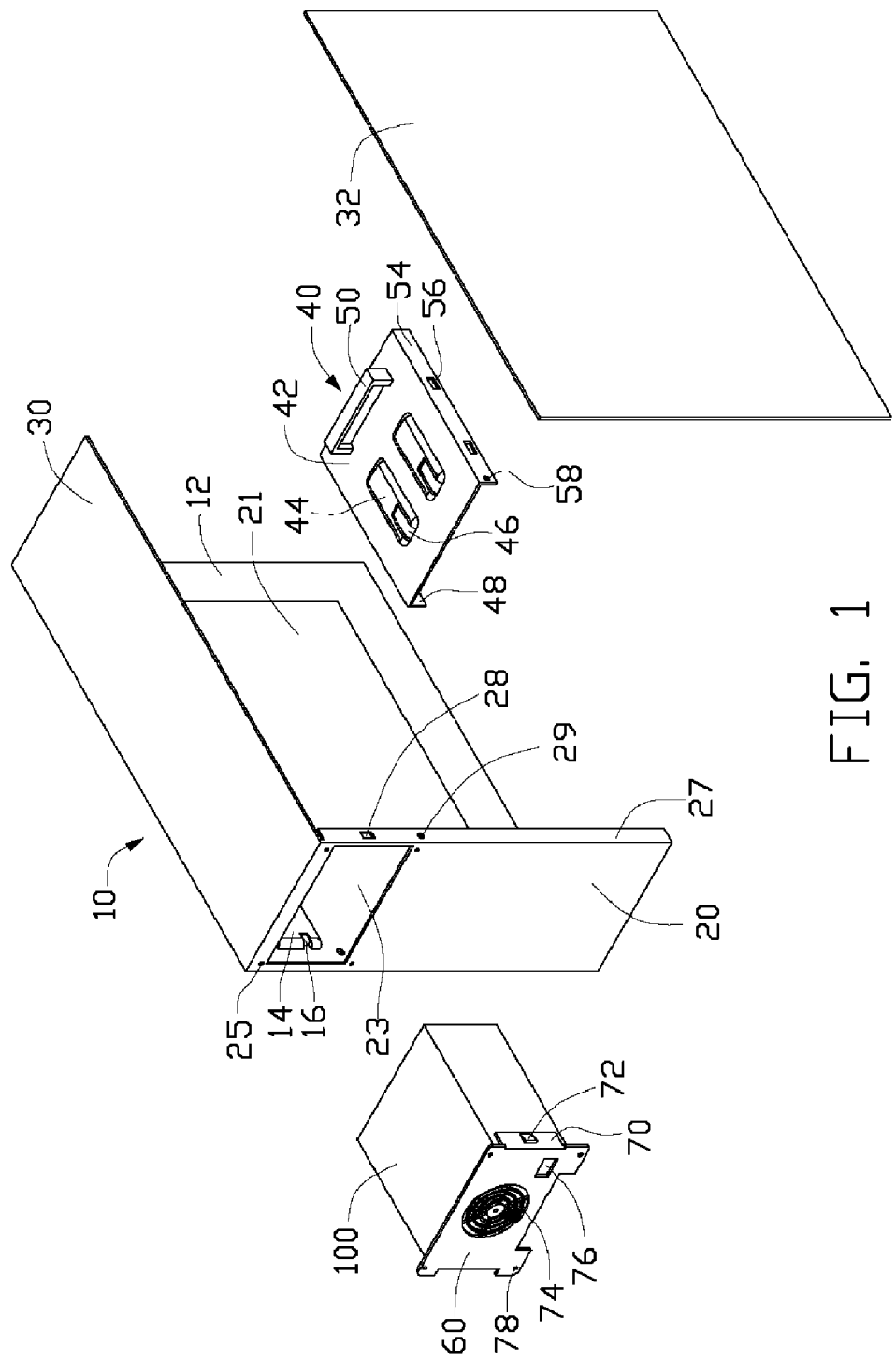
FIG. 1 is an exploded, isometric view of an exemplary embodiment of a mounting apparatus and a power supply, the mounting apparatus including a board.
Figure 2:
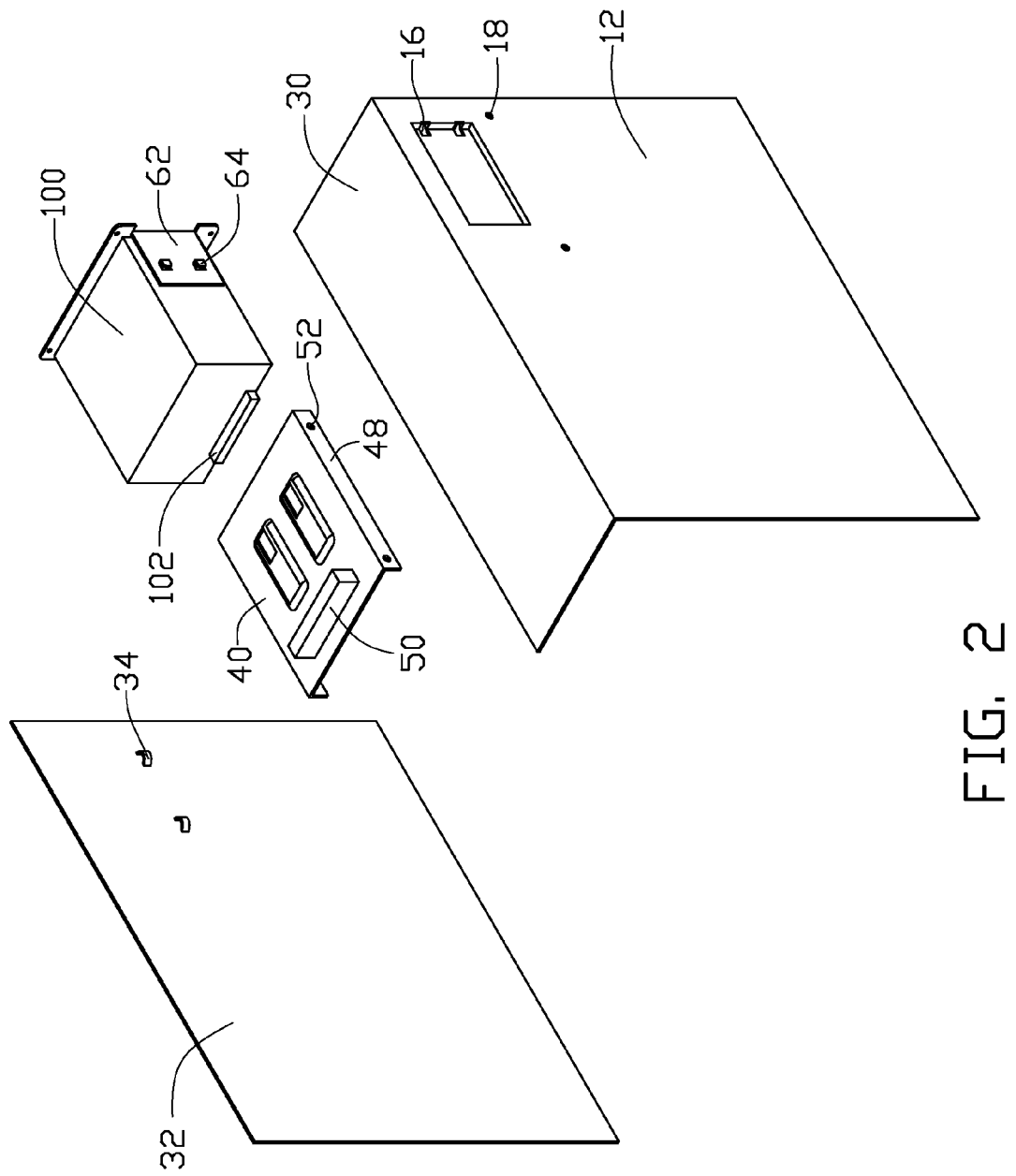
FIG. 2 is similar to FIG. 1, but viewed from another perspective.
Figure 3:
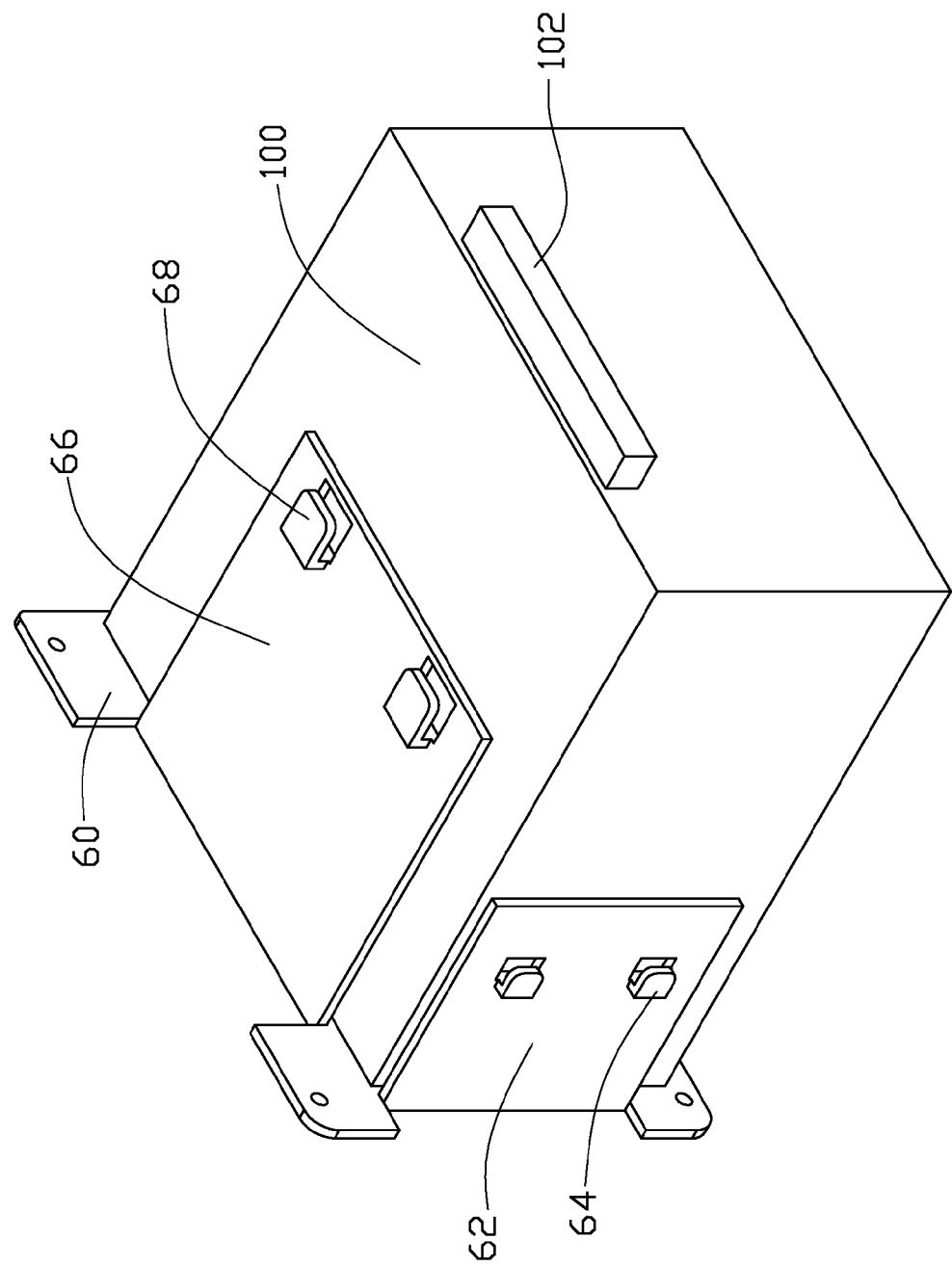
FIG. 3 is an enlarged, inverted view of the power supply and the board of FIG. 1.

Referring to FIGS. 1 to 3, an exemplary embodiment of a mounting apparatus for mounting a power supply 100 to a computer system includes a computer enclosure 10, a bracket 40, and a board 60. A first connector 102 protrudes from a front side of the power supply 100.

The computer enclosure 10 includes a first sidewall 12, a top wall 30, a rear wall 20, and a second sidewall 32 detachably mounted to the top wall 30 and the rear wall 20 and opposite to the first sidewall 12 to form a generally rectangular enclosure 10. A first protrusion 14 protrudes toward the second sidewall 32 from the rear end of the inner surface of the first sidewall 12, adjacent the top wall 30. A plurality of first latching slots 16 is defined in the first protrusion 14, facing the rear wall 20. A plurality of mounting holes 18 is defined in the first sidewall 12 below the first protrusion 14. The rear wall 20 defines an opening 23 therein, adjacent the top wall 30, for the power supply 100 passing therethrough. A plurality of fixing holes 25 is defined in the rear wall 20 around the opening 23. A flange 27 perpendicularly extends from the rear wall 20, opposite to the first sidewall 12. A locking hole 28 is defined in the flange 27, adjacent the top wall 30. A mounting hole 29 is defined in the flange 27, adjacent and below the locking hole 28. A plurality of bridge-shaped securing portions 34 protrudes from an inner surface of the second sidewall 32.

The bracket 40 includes a bottom plate 42, and first and second side plates 48, 54 perpendicularly extending down from opposite sides of the bottom plate 42. A plurality of parallel second protrusions 44 protrudes up from the bottom plate 42. A second latching slot 46 is defined in the rear end of each second protrusion 44. A second connector 50 electrically connected to a printed circuit board 21 of the computer system is mounted to a front end of the bottom plate 42, for engaging with the first connector 102 of the power supply 100. A plurality of mounting holes 52 is defined in the first side plate 48. A plurality of securing holes 56 is defined in the second side plate 54. A mounting hole 58 is defined in the rear end of the second side plate 54.

The board 60 is attached to a rear side surface of the power supply 100, and defines a vent 74 in a center thereof, corresponding to an air outlet (not shown) of the power supply 100. A first tab 62 perpendicularly extends from one end of the board 60. A second tab 70 perpendicularly extends from opposite end of the board 60. A third tab 66 perpendicularly extends from the bottom side of the board 60. A plurality of L-shaped hooks 64 and 68 respectively protrudes from the first and third tabs 62 and 66. An elastic locking portion 72 extends from the second tab 70. A plurality of fixing holes 78 is defined in the board 60 around the vent 74 thereof. A through hole 76 is defined in the board 60, for a plug (not shown) of the power supply 100 being exposed therethrough.

Figure 4:
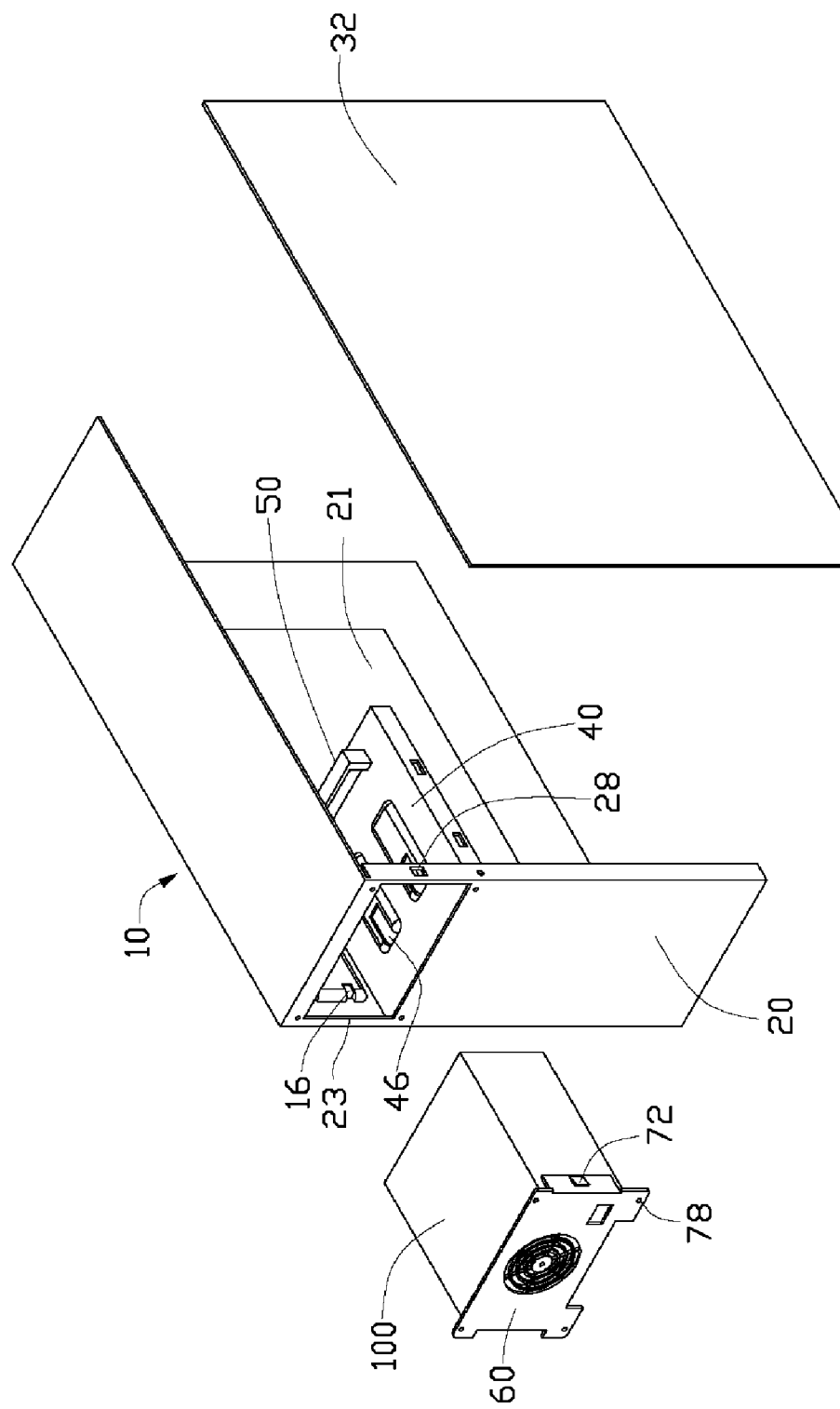
FIG. 4 is a partially assembled view of FIG. 1.
Figure 5:
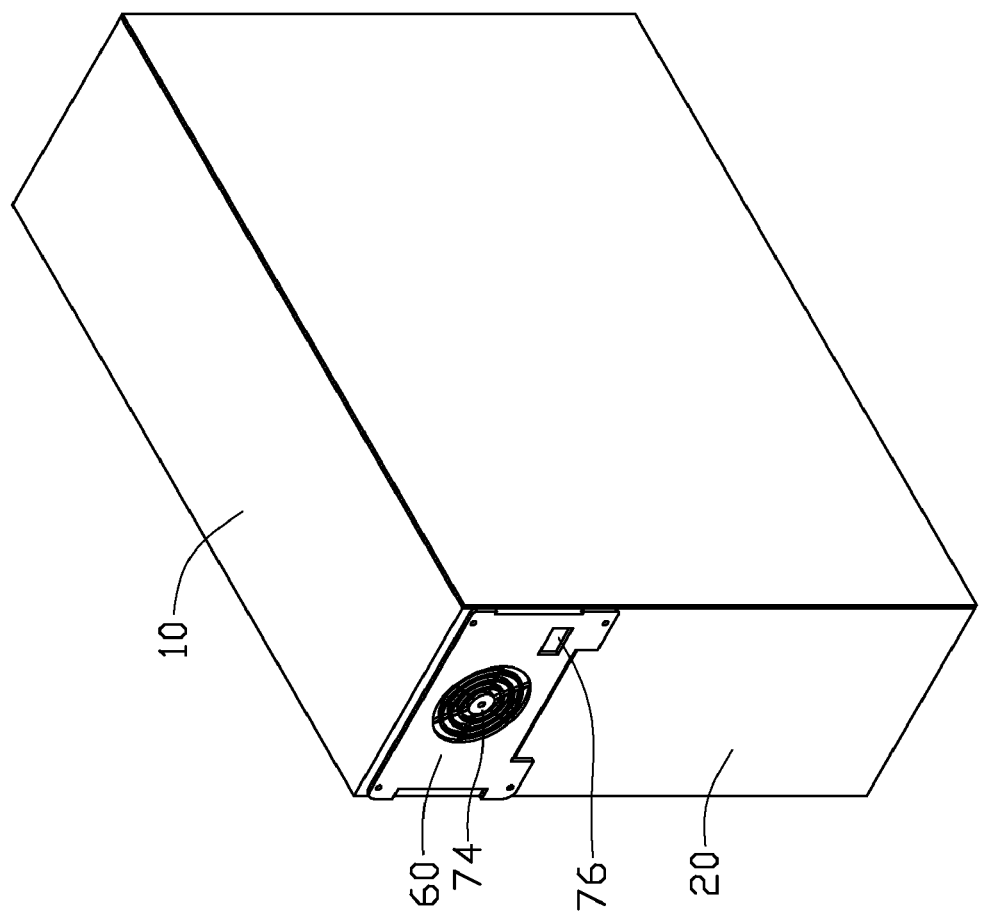
FIG. 5 an assembled view of FIG. 1.
Figure 6:
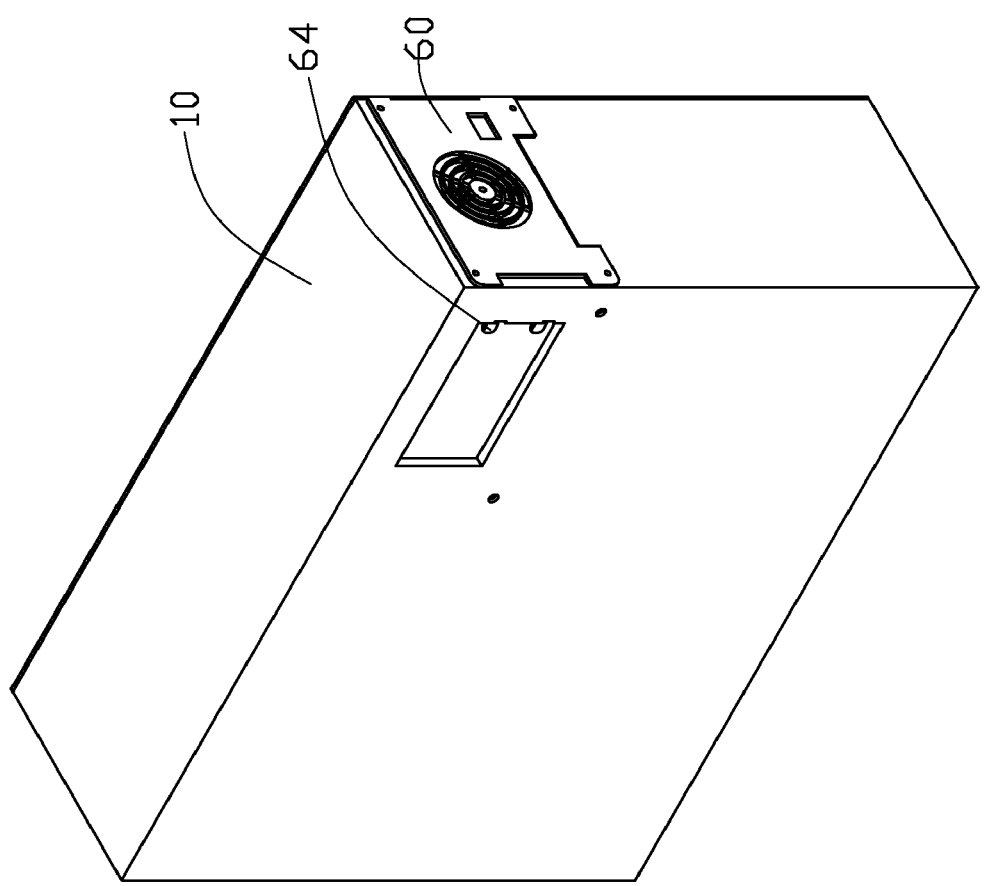
FIG. 6 is similar to FIG. 5, but viewed from another perspective.

Referring to FIGS. 4-6, in assembling the computer enclosure 10 and the bracket 40, the bracket 40 is placed between the first sidewall 12 and the flange 27, with the rear end of the bracket 40 resisting against the inner surface of the rear wall 20. A plurality of screws (not shown) is inserted through the plurality of mounting holes 52 of the bracket 40 to engage in the plurality of mounting holes 18 of the first sidewall 12, to fix the bracket 40 to the first sidewall 12. A screw (not shown) is inserted through the mounting hole 58 of the bracket 40 to engage in the mounting hole 29 of the flange 27, to fix the bracket 40 to the flange 27. The second sidewall 32 is attached to the flange 27 and the top wall 30, opposite to and parallel with the first sidewall 12, with the plurality of securing portions 34 engaging in the plurality of securing holes 56 of the bracket 40. As a result, the first and second sidewalls 12 and 32 sandwich the bracket 40 therebetween.

In assembling the power supply 100, the front side of the power supply 100 passes through the opening 23 of the rear wall 20 to enter into the computer enclosure 10. The power supply 100 is moved further along the bottom plate 42 of the bracket 40, until the plurality of hooks 64 and 68 of the board 60 engages in the plurality of first and second latching slots 16 and 46, respectively. The first connector 102 of the power supply 100 engages with the second connector 50. The locking portion 72 of the board 60 is engaged in the locking hole 28 of the flange 27. Therefore, the board 60 resists against the rear wall 20, to cover the opening 23, with the plurality of fixing holes 78 of the board 60 aligning with the plurality of fixing holes 25 of the rear wall 20. A plurality of screws is inserted through the plurality of fixing holes 78 to engage in the plurality of fixing holes 25, to fix the board 60 to the rear wall 20. Therefore, the power supply 100 is assembled.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A mounting apparatus for mounting a power supply that comprises a first connector on a front side, comprising:
   an enclosure comprising a rear wall, wherein the rear wall defines an opening therein for the power supply passing therethrough;
   a bracket, mounted to the enclosure and below the opening, capable of supporting the power supply, wherein a second connector protrudes up from a front end of the bracket, configured for engaging with the first connector of the power supply; and
   a board configured for being attached to a rear side of the power supply, to cover the opening of the rear wall;
   wherein a plurality of latching slots is defined in the enclosure or the bracket, a plurality of hooks is formed on the board, to engage in the plurality of latching slots;
   the enclosure further comprises a first sidewall perpendicularly extending forward from a side of the rear wall, a plurality of mounting holes is defined in the first sidewall; the bracket comprises a bottom plate perpendicular to the rear wall and configured for supporting the power supply, and a first side plate perpendicularly extending down from a side of the bottom plate; a plurality of mounting holes is defined in the first side plate, corresponding to the plurality of mounting holes of the first sidewall.

2. The mounting apparatus of claim 1, wherein the plurality of latching slots is defined in the first sidewall.

3. The mounting apparatus of claim 2, wherein a flange perpendicularly extends from a side of the rear wall opposite to the first sidewall, a locking hole is defined in the flange; a tab perpendicularly extends forward from an end of the board, an elastic locking portion extends from the tab, for engaging in the locking hole.

4. The mounting apparatus of claim 2, wherein a protrusion protrudes from an inner surface of the first sidewall, the plurality of latching slots is defined in a rear end of the protrusion, facing the rear wall; a tab perpendicularly extends forward from an end of the board, and the plurality of hooks is L-shaped and extends from the tab.

5. The mounting apparatus of claim 1, wherein a protrusion protrudes up from the bracket, the plurality of latching slots is defined in a rear end of the protrusion, facing the rear wall; a tab perpendicularly extends forward from a bottom side of the board, and the plurality of hooks is L-shaped and extends from the tab.

6. The mounting apparatus of claim 1, wherein the rear wall comprises a flange perpendicularly extending forward from an opposite side to the first sidewall thereof, a mounting hole is defined in the flange; the bracket further comprises a second side plate perpendicularly extending down from a side of the bottom plate opposite to the first side plate, a mounting hole is defined in the second side plate, corresponding to the mounting hole of the flange.

7. The mounting apparatus of claim 6, wherein the enclosure still further comprises a second sidewall, a plurality of securing portions protrudes from an inner surface of the second sidewall; the second side plate of the bracket defines a plurality of securing holes therein for receiving the plurality of securing portions, resulting in the first and second sidewalls sandwiching the bracket therebetween.

8. The mounting apparatus of claim 1, wherein the rear wall defines a plurality of first fixing holes around the opening, the board defines a vent and a plurality of second fixing holes around the vent, the board is fixed to the rear wall via a plurality of screws being engaged in the plurality of first and second fixing holes.

9. A computer system comprising:
   a printed circuit board;
   a power supply comprising a first connector on a front side thereof;
   an enclosure comprising a rear wall, wherein the rear wall defines an opening therein for the power supply passing therethrough;
   a bracket mounted to the enclosure below the opening, for supporting the power supply, wherein a second connector, electrically connected to the printed circuit board, protrudes up from a front end of the bracket, for engaging with the first connector of the power supply; and
   a board attached to a rear side of the power supply and covering the opening of the rear wall;
   wherein a plurality of latching slots is defined in the enclosure or the bracket, a plurality of hooks is formed on the board, to engage in the plurality of latching slots.

10. The computer system of claim 9, wherein the enclosure further comprises a first sidewall perpendicularly extending from a side of the rear wall, the plurality of latching slots is defined in the first sidewall.

11. The computer system of claim 10, wherein a flange perpendicularly extends from a side of the rear wall opposite to the first sidewall, a locking hole is defined in the flange; a tab perpendicularly extends forward from an end of the board, an elastic locking portion extends from the tab, for engaging in the locking hole.

12. The computer system of claim 10, wherein a protrusion protrudes from an inner surface of the first sidewall, the plurality of latching slots is defined in a rear end of the protrusion, facing the rear wall; a tab perpendicularly extends forward from an end of the board, the plurality of hooks is L-shaped and extends from the tab.

13. The computer system of claim 9, wherein a protrusion protrudes up from the bracket, the plurality of latching slots is defined in a rear end of the protrusion, facing the rear wall; a tab perpendicularly extends forward from a bottom side of the board, the plurality of hooks is L-shaped and extends from the tab.

14. The computer system of claim 9, wherein the enclosure further comprises a first sidewall perpendicularly extending forward from a side of the rear wall, a plurality of mounting holes is defined in the first sidewall; the bracket comprises a bottom plate perpendicular to the rear wall and configured for supporting the power supply, and a first side plate perpendicularly extending down from a side of the bottom plate; a plurality of mounting holes is defined in the first side plate, corresponding to the plurality of mounting holes of the first sidewall.

15. The computer system of claim 14, wherein the rear wall comprises a flange perpendicularly extending forward from a side thereof opposite to the first sidewall, a mounting hole is defined in the flange; the bracket further comprises a second side plate perpendicularly extending down from an opposite side of the bottom plate, a mounting hole is defined in the second side plate, corresponding to the mounting hole of the flange.

16. The computer system of claim 15, wherein the enclosure further comprises a second sidewall, a plurality of securing portions protrudes from an inner surface of the second sidewall; the second side plate of the bracket defines a plurality of securing holes therein for receiving the plurality of securing portions, resulting in the first and second sidewalls sandwiching the bracket therebetween.

17. The computer system of claim 9, wherein the rear wall defines a plurality of first fixing holes around the opening, the board defines a vent and a plurality of second fixing holes around the vent, the board is fixed to the rear wall via a plurality of screws being engaged in the plurality of first and second fixing holes.

* * * * *